United States Patent [19]
Williams et al.

[11] Patent Number: 5,157,546
[45] Date of Patent: Oct. 20, 1992

[54] VOLUME DISPLAY SYSTEM AND METHOD FOR INSIDE-OUT VIEWING

[75] Inventors: Rodney D. Williams, Plano; Felix Garcia, Jr., Roundrock, both of Tex.

[73] Assignee: Texas Instruments Incorporated, Dallas, Tex.

[21] Appl. No.: 629,806

[22] Filed: Dec. 19, 1990

[51] Int. Cl.$^5$ ............... G02B 27/22; H04N 13/04
[52] U.S. Cl. ................... 359/462; 359/478; 358/88
[58] Field of Search ............... 340/700; 359/478 (U.S. only), 462 (U.S. only), 212 (U.S. only), 201 (U.S. only), 202 (U.S. only); 358/88 (U.S. only), 89 (U.S. only)

[56] References Cited

U.S. PATENT DOCUMENTS

| | | | |
|---|---|---|---|
| 3,956,833 | 5/1976 | Chase | 358/89 |
| 4,084,182 | 4/1979 | Maiman | 358/62 |
| 4,870,485 | 9/1989 | Downing et al. | 358/88 |
| 4,871,231 | 10/1989 | Garcia | 358/63 |
| 4,881,068 | 11/1989 | Korevaar et al. | 340/700 |
| 5,042,909 | 8/1991 | Garcia et al. | 358/89 |

FOREIGN PATENT DOCUMENTS

| | | | |
|---|---|---|---|
| 257695 | 12/1985 | Japan | 358/88 |
| 2095068 | 9/1982 | United Kingdom | 358/88 |

*Primary Examiner*—Jon W. Henry
*Attorney, Agent, or Firm*—L. Joy Griebenow; William E. Hiller; Richard L. Donaldson

[57] ABSTRACT

A system wherein the observer can be positioned at the interior of a three dimensional display and observe the display looking outwardly therefrom. In accordance with a first embodiment of the invention, the rotating disk of the prior art is made sufficiently large and at sufficient angle, preferably 45 degrees with respect to the shaft rotating the disk, so that the observer or a camera can be located in a conical portion of the cylinder swept out by the disk wherein the disk does not travel. In accordance with a second embodiment of the invention, the rotating shaft onto which the disk is anchored is a hollow, transparent cylinder and is sufficiently large to retain a viewer or a camera within the cylinder. In this way, the observer can rotate 360 degrees within the cylinder to view the entire display looking outwardly from the interior thereof.

12 Claims, 2 Drawing Sheets

VOLUME DISPLAY SYSTEM AND METHOD FOR INSIDE-OUT VIEWING

CROSS-REFERENCE TO COPENDING APPLICATIONS

This application is an improvement of copending application Ser. No. 07/584,413 now issued as U.S. Pat. No. 5,042,909 the contents of which are incorporated herein by reference.

BACKGROUND OF THE INVENTION

1. Field of the Invention

This invention relates to a three dimensional display system and, more specifically, to a three dimensional display system wherein the observer can be located within the display itself and observe the display over an angle of up to 360 degrees.

2. Brief Description of the Prior Art

In accordance With the above noted copending application, a disk-like screen is connected to the end of a motor shaft. The disk is attached to the shaft of a motor at a 45 degree angle, though this angle can be varied to provide a larger or smaller height or z-axis dimension, so that, as the disk rotates, a displacement of any given point thereon along the z-axis takes place. The image is formed on the screen by projecting a light beam, such as from a laser, through a modulator and toward a scanner which produces an x-y scan of the beam on a screen, the screen being the disk discussed hereinabove. The disk can be translucent, such as lucite, so that images can be projected thereon onto the front and/or rear surfaces thereof. The modulation or strobing of the scan is then synchronized with the rotating disk by control of the motor speed so that a three dimensional pattern appears on the screen. It can be seen that any point on the x-y scan from the scanner which impinges upon the screen will move along a z-axis direction since the screen or disk at that point produces such z-axis movement. This movement of the displayed image provides the three dimensional effect. The adjustment of the angle between the disk surface and the x-y plane of the scanned x-y image will determine the z-dimension or height of the three dimensional image, the disk angle being adjustable on-line, if so desired.

While the disk is a planar opaque screen for receiving a scanned image thereon on one surface thereof, the screen can take many other forms. For example, the disk can be translucent, such as lucite, and thereby be capable of receiving a scanned image thereon on both major surfaces. The lucite disk can be in the form of a pair of angularly truncated cylinders with the same truncation angle which fit together at the angularly truncated surfaces to form a new cylinder wherein the surfaces at which truncation takes place are translucent. In addition, the screen can take on shapes other than planar, it merely being necessary that at least some portion thereof move in the z-direction during rotation thereof while projection of the x-y image thereon takes place to provide the three dimensional image. As a further embodiment, the disk can be placed in a gas filled or evacuated CRT with the image impinging thereon being the scanned beam of the tube. Phosphors can be disposed on the disk which, when excited, will form the three dimensional image. As a still further embodiment, the screen can be planar and disposed normal to the projected x-y image. The three dimensional affect is then provided by moving the entire screen along the z-axis in synchronism with the scanned x-y image to provide the three dimensional affect. A cam driven shaft attached to the screen can provide such screen movement along the z-axis.

While the above described prior system provides a highly effective three-dimensional display, the observer must view the display from point external thereto. It is desirable to provide a three dimensional display wherein the observer can be located within the display itself and view the entire display looking outwardly therefrom rather than inwardly as would be required in simulators and the like.

SUMMARY OF THE INVENTION

In accordance with the present invention, there is provided a system wherein the observer can be positioned at the interior of the three dimensional display and observe the display looking outwardly therefrom.

Briefly, in accordance with a first embodiment of the invention, the rotating disk of the prior art is made sufficiently large and at sufficient angle, preferably 45 degrees with respect to the shaft rotating the disk, so that the observer or a camera can be located in a conical portion of the cylinder swept out by the disk wherein the disk does not travel. The term "observer" as used herein refers to both a human observer as well as inanimate observing equipment.

In accordance with a second embodiment of the invention, the rotating shaft onto which the disk is anchored is a hollow, transparent cylinder and is sufficiently large to retain a viewer or a camera within the cylinder. The disk is preferably in the shape of a double helix or other compound shape. In this way, the observer can rotate 360 degrees within the cylinder to view the entire display looking outwardly from the interior thereof.

DESCRIPTION OF THE PREFERRED EMBODIMENTS

Figure 1:
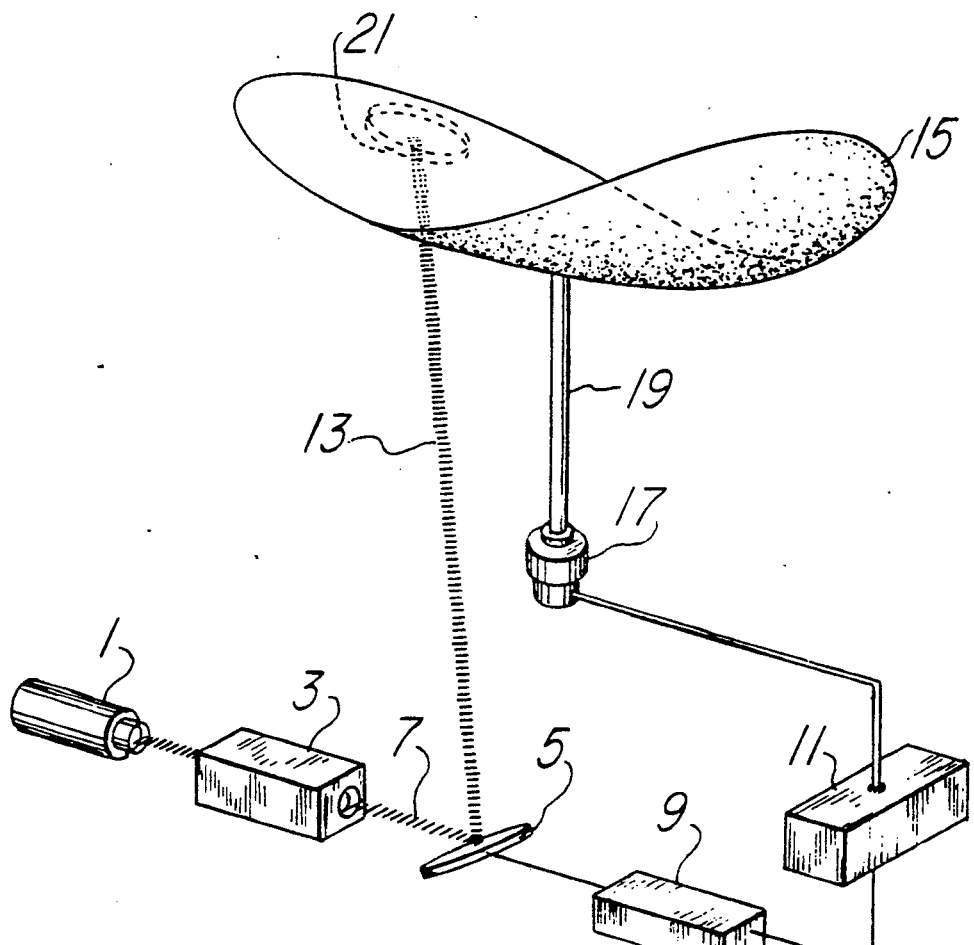
FIG. 1 is a schematic diagram of a three dimensional display system capable of utilizing a disk in accordance with the present invention.

Referring first to FIG. 1, there is shown a schematic diagram in accordance with a first embodiment of the projected volume display system in accordance with the present invention.

The system includes a laser 1 which projects a light beam through a modulator 3 onto an x-y scanner 5. The modulator 3 is externally controlled in predetermined manner (not shown) to control the intensity of the laser light beam 7 passing therethrough. It is understood that the light intensity can be controlled so that no light passes through the modulator, when so desired. The x-y scanner 5, whose scanning rate and position are controlled by x,y inputs 9 and synchronization electronics 11 are shown in detail in the above noted copending application. The x-y scanner 5 scans the light beam 7 from the modulator 3 along the x-y plane and projects this x-y image 13 onto a transparent screen 15, preferably polymethylmethacrylate. The screen 15 is in the form of a disk.

The screen 15 is rotated by a motor 17 under rotary speed control of the synchronization electronics 11 via a motor shaft 19 connected to the screen to form the three dimensional image 21. The rotary speed of the shaft 19 is preferably synchronized with the scanning rate of the scanner 5. A typical synchronization circuit is shown and described in FIG. 2 of the above noted patent application and is incorporated herein by reference. The angle of the screen 15 is preferably 45 degrees with respect to the direction of the image 13 from the scanner 5, it being understood that the z-dimension is a function of the angle of the screen.

Figure 2:
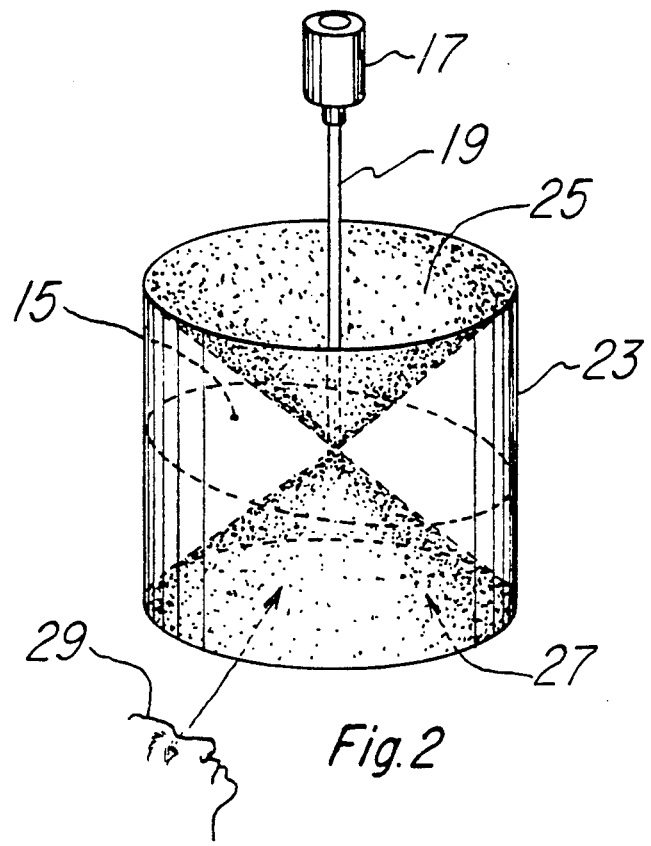
FIG. 2 is a diagram of a first embodiment of the disk in accordance with the present invention with observer located within the display area.

Referring now to FIG. 2, there is shown a first embodiment of the disk system of FIG. 1 wherein the observer or a camera 29 is located within the three dimensional display and can observe the display over an angle of 360 degrees and look outwardly from the center of the display. The display includes the disk 15 which is driven by the motor 17 via the shaft 19. As can be seen in FIG. 2, the rotating disk 15 traverses a cylindrical path 23. However, there are two conical regions 25 and 27 which the disk 15 does not reach. It is therefore apparent that an observer or a camera can be located in one or both of the conical regions 25 and 27 and view the three dimensional image located in the region 23. As can be seen from FIG. 2, the observer 29 is disposed within the three dimensional image, can rotate a full 360 degrees to view all portions of the image in region 23 and is viewing the three dimensional image looking outwardly from a center region thereof.

Figure 3:
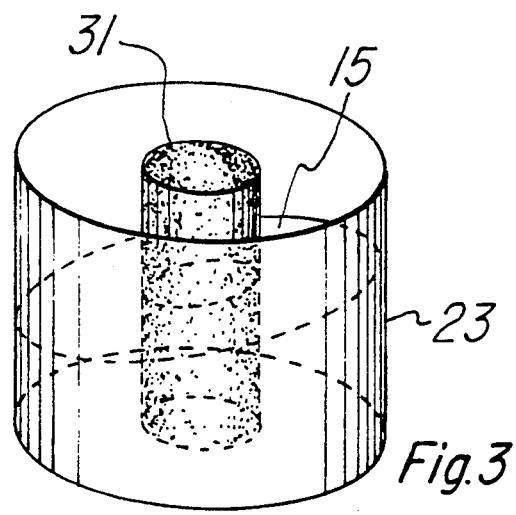
FIG. 3 is a diagram of a second embodiment of the disk in accordance with the present invention with observer located within the display area.

Referring now to FIG. 3, there is shown a second embodiment of the present invention. In this embodiment the shaft 19 of FIG. 1 is replaced with a hollow, transparent shaft 31 wherein the hollow interior region is sufficiently large to permit an observer by way of human, camera or the like to be positioned therein. The hollow shaft can be formed of any rigid transparent material, such as, for example, lucite or polymethylmethacrylate. The rotating disk 15 is preferably a double helix and is secured to the hollow shaft 31 which will also rotate and drive the disk as in the first embodiment and the above noted copending application. The disk will provide the three dimensional display in the display volume 23 as in the first embodiment. It is apparent that an observer located in the hollow portion of the shaft 31 can rotate a full 360 degrees to view all portions of the image in region 23 and is viewing the three dimensional image looking outwardly from a center region thereof. It should also be understood that a transparent non-rotating safety screen or the like can be positioned within the hollow shaft 31 between the observer and the shaft wall to protect the observer from the rotating shaft, if desired.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A three dimensional display system which comprises:
   (a) a rotatable screen providing a three dimensional display; and
   (b) a hollow transparent shaft secured to said screen at the axis of rotation thereof.

2. The display system of claim 1 further including an observer disposed in said hollow shaft.

3. The display system of claim 1 further including means to scan a two dimensional image onto said rotatable screen, said screen being positioned non-normal to said shaft.

4. The display system of claim 1 wherein said screen is secured to said shaft at an angle of about 45 degrees.

5. The display system of claim 2 wherein said observer is a camera.

6. The display of claim 1 wherein said screen is a compound shape.

7. The display of claim 6 wherein said compound shape is a double helix.

8. A method of observing a three dimensional display comprising the steps of:
   (a) providing a rotatable screen providing a three dimensional display; and
   (b) providing a hollow transparent shaft secured to said screen at the axis of rotation thereof.

9. The method of claim 8 further including the step of placing an observer disposed in said hollow shaft.

10. The method of claim 8 further including the step of scanning a two dimensional image onto said rotatable screen and positioning said screen non-normal to said shaft.

11. The method of claim 9 wherein said observer is a camera.

12. The method of claim 8 further including securing said screen to said shaft at an angle of about 45 degrees.

* * * * *